(12) United States Patent
Sugimoto et al.

(10) Patent No.: US 10,371,886 B2
(45) Date of Patent: Aug. 6, 2019

(54) SPACER A FOR DISPLAY APPARATUS

(71) Applicant: Sakai Display Products Corporation, Sakai-shi, Osaka (JP)

(72) Inventors: Arimasa Sugimoto, Sakai (JP); Yasunori Minakuchi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/320,308

(22) PCT Filed: Sep. 26, 2014

(86) PCT No.: PCT/JP2014/075698
§ 371 (c)(1),
(2) Date: Dec. 19, 2016

(87) PCT Pub. No.: WO2016/046975
PCT Pub. Date: Mar. 31, 2016

(65) Prior Publication Data
US 2017/0205569 A1   Jul. 20, 2017

(51) Int. Cl.
*G02F 1/1339* (2006.01)
*F21V 8/00* (2006.01)
(Continued)

(52) U.S. Cl.
CPC ..... *G02B 6/0088* (2013.01); *G02F 1/133308* (2013.01); *G02F 1/133512* (2013.01);
(Continued)

(58) Field of Classification Search
CPC .................. G02F 1/133308; G02B 6/0088
See application file for complete search history.

(56) References Cited

U.S. PATENT DOCUMENTS 8,147,113 B2 * 4/2012 Hamada ............... G02B 6/0085
                                                              362/218
8,459,857 B2 * 6/2013 Shibata ................. G02B 6/009
                                                              362/607
(Continued)

FOREIGN PATENT DOCUMENTS

CN       1847942 A    10/2006
CN     101943351 A     1/2011
(Continued)

OTHER PUBLICATIONS

Sharpe, D., Foam Rubber vs. Sponge Rubber: What's the Difference?, Elasto Proxy Inc., Web Page, Feb. 24, 2017.*
(Continued)

*Primary Examiner* — Sean P Gramling
*Assistant Examiner* — Keith G. Delahoussaye
(74) *Attorney, Agent, or Firm* — Rudy J. Ng; Bret E. Field; Bozicevic, Field & Francis LLP

(57) ABSTRACT

Provided is a display apparatus capable of preventing the warp and the optical leak of an optical sheet. The display apparatus includes: a display panel which displays an image; a light guide plate which faces the display panel and emits light towards the display panel; a spacer which forms a gap between the light guide plate and the display panel; and an optical sheet arranged at the gap. A peripheral portion of the light guide plate is located outside with respect to the display panel, and the spacer includes a panel attaching part which is attached at an edge portion of one surface of the display panel and with a light-guide-plate attaching part which continues to the panel attaching part and is attached at an edge portion in one surface of the light guide plate.

16 Claims, 5 Drawing Sheets

(51) Int. Cl.
*G02F 1/1333* (2006.01)
*G02F 1/1335* (2006.01)

(52) U.S. Cl.
CPC ............... *G02F 1/133615* (2013.01); *G02F 2001/133317* (2013.01); *G02F 2001/133388* (2013.01); *G02F 2201/54* (2013.01)

(56) References Cited

U.S. PATENT DOCUMENTS

| | | | |
|---|---|---|---|
| 9,025,104 B2 * | 5/2015 | Hsiao | G02F 1/133308 349/58 |
| 2004/0150981 A1 | 8/2004 | Katsuda et al. | |
| 2005/0062899 A1 * | 3/2005 | Fukayama | G02F 1/133308 349/58 |
| 2011/0069255 A1 | 3/2011 | Choi et al. | |
| 2012/0140521 A1 | 6/2012 | Kao et al. | |
| 2012/0162546 A1 * | 6/2012 | Shimomichi | H04N 5/645 348/794 |
| 2012/0250354 A1 * | 10/2012 | Yoshida | G02B 6/0085 362/613 |
| 2013/0044271 A1 | 2/2013 | Momose et al. | |
| 2013/0063681 A1 | 3/2013 | Zhou | |
| 2013/0300973 A1 | 11/2013 | Fan et al. | |
| 2013/0342789 A1 | 12/2013 | Zhang et al. | |
| 2014/0204275 A1 | 7/2014 | Shimizu | |
| 2014/0204310 A1 | 7/2014 | Lee et al. | |
| 2014/0218656 A1 | 8/2014 | Maruno | |
| 2015/0177548 A1 * | 6/2015 | Jeon | G02F 1/133308 349/12 |
| 2015/0253612 A1 | 9/2015 | Hasegawa et al. | |

FOREIGN PATENT DOCUMENTS

| | | |
|---|---|---|
| CN | 102720994 A | 10/2012 |
| CN | 102955290 A | 3/2013 |
| CN | 103148416 A | 6/2013 |
| JP | 2007-232809 A | 9/2007 |
| JP | 2012-118498 A | 6/2012 |
| JP | 2014-142614 A | 8/2014 |
| JP | 2014154931 A | 8/2014 |
| WO | WO2012169441 A1 | 12/2012 |
| WO | WO2013024712 A1 | 2/2013 |

OTHER PUBLICATIONS

Office Action for U.S. Appl. No. 15/321,079 dated Oct. 11, 2017.
Final Office Action for U.S. Appl. No. 15/321,079 dated May 8, 2018.
Office Action for U.S. Appl. No. 15/321,079 dated Sep. 28, 2018.
Office Action for U.S. Appl. No. 15/324,418 dated Oct. 16, 2017.
Final Office Action for U.S. Appl. No. 15/324,418 dated May 18, 2018.
Office Action for U.S. Appl. No. 15/324,418 dated Oct. 2, 2018.

\* cited by examiner

SPACER A FOR DISPLAY APPARATUS

CROSS-REFERENCE TO RELATED APPLICATIONS

This application is the national phase under 35 U.S.C. § 371 of PCT International Application No. PCT/JP2014/075698 which has International filing date of Sep. 26, 2014 and designated the United States of America.

FIELD

The technology herein relates to a display apparatus which displays an image.

BACKGROUND AND SUMMARY

A thin display apparatus having a small occupation area despite a large display screen thereof, has been generally used widely. The display apparatus comprises: a light guide plate which faces a display panel; a light source which faces a peripheral surface of the light guide plate; a spacer which forms a gap between the display panel and the light guide plate; and a plurality of optical sheets provided on the light guide plate in the gap.

A display apparatus comprising a frame-shaped spacer is disclosed. An adhesive is applied around the exterior of the frame-shaped spacer.

The frame-shaped spacer is used, which can secure the rigidity and can reduce a frame member being conventionally used and supporting the display panel and the light guide plate.

A display area which displays an image is formed in a display panel inside a frame-shaped spacer. The frame-shaped spacer and an adhesive are arranged outside the display area (in a non-display area).

Recently, requested are a smaller width of the non-display area and an improvement of an external appearance quality (the so-called making a frame narrower). That causes a possibility that when both of the frame-shaped spacer and the adhesive are arranged in the non-display area, a gap between the optical sheet and the frame-shaped spacer may be smaller than a width for the optical sheet to expand and contract.

In this case, when the optical sheet is heated and then expands, the optical sheet abuts on the frame-shaped spacer and then warps. In a case where the optical sheet is designed smaller in order to prevent the warp, light emitted from the light guide plate directly reaches the display panel and the so-called optical leak occurs when the optical sheet is cooled and then contracts.

It is an object to provide an aspect of disclosure of a display apparatus capable of preventing the warp and the optical leak of the optical sheet.

According to an aspect of disclosure, there is provided a display apparatus comprising: a display panel which displays an image; a light guide plate which faces the display panel and emits light towards the display panel; a spacer which forms a gap between the light guide plate and the display panel; and an optical sheet arranged at the gap, wherein a peripheral portion of the light guide plate is located outside with respect to the display panel, and the spacer is provided with: a panel attaching part which is attached at an edge portion in one surface of the display panel; and a light-guide-plate attaching part which continues to the panel attaching part and is attached at an edge portion in one surface of the light guide plate.

The light-guide-plate attaching part of the spacer which is fastened to the light guide plate is located outside with respect to the panel attaching part which is fastened to the display panel, and a gap allowing the optical sheet to expand and contract is thereby formed between the optical sheet arranged on the light guide plate and the light-guide-plate attaching part.

According to another aspect of disclosure, the panel attaching part is plate-shaped and one surface of the panel attaching part is attached to the one surface of the display panel, the light-guide-plate attaching part is plate-shaped and one surface of the light-guide-plate attaching part is attached to the one surface of the light guide plate, and the light-guide-plate attaching part continues to the panel attaching part via a connecting part.

The panel attaching part and the light-guide-plate attaching part have a shape of a plate approximately parallel to the display panel and the light guide plate, which can prevent the increase in size of the display apparatus.

According to another aspect of disclosure, the connecting part is plate-shaped and is orthogonal to the panel attaching part and to the light-guide-plate attaching part.

The connecting part is orthogonal to the panel attaching part and to the light-guide-plate attaching part, and the gap is thereby between the display panel and the light guide plate reliably.

According to another aspect of disclosure, the connecting part is plate-shaped and is inclined with respect to the panel attaching part and to the light-guide-plate attaching part to form an acute angle or an obtuse angle.

When one of the optical sheets which is located at a region proximal to the display panel has a thermal expansion coefficient higher than that of the other of the optical sheets, the connecting part is inclined with respect to the panel attaching part and the light-guide-plate attaching part to form an acute angle, in order to form a larger gap at the region proximal to the display panel. In contrast, when one of the optical sheets which is located at a region proximal to the light guide plate has a thermal expansion coefficient higher than that of the other of the optical sheets, the connecting part is inclined with respect to the panel attaching part and to the light-guide-plate attaching part to form an obtuse angle, in order to form a larger gap at the region proximal to the light guide plate.

According another aspect of disclosure, the panel attaching part is plate-shaped and one surface of the panel attaching part is attached to the one surface of the display panel, and the light-guide-plate attaching part has a thickness thicker than that of the panel attaching part.

The light-guide-plate attaching part has the thickness thicker than that of the panel attaching part, which increases the rigidity.

According to another aspect of disclosure, the light guide plate is made of glass, and the spacer is made of metal or foamed polymer.

As compared with a resin member made of plastic etc., a glass member whose linear expansion coefficient is low is used for the light guide plate and a metal member or a foamed polymer member is used for the spacer, which reduces the warp occurring therebetween at the time of heating or cooling.

According to an aspect of disclosure, the light-guide-plate attaching part of the spacer which is fastened to the light guide plate is located outside with respect to the panel attaching part which is fastened to the display panel, and the gap allowing the optical sheet to expand and contract is thereby formed between the optical sheet arranged on the light guide plate and the light-guide-plate attaching part. That can prevent the warp of the optical sheet and the optical leak.

The above and further objects and features will more fully be apparent from the following detailed description with accompanying drawings.

DETAILED DESCRIPTION OF NON-LIMITING EXAMPLE EMBODIMENTS

Embodiment 1

Figure 1:
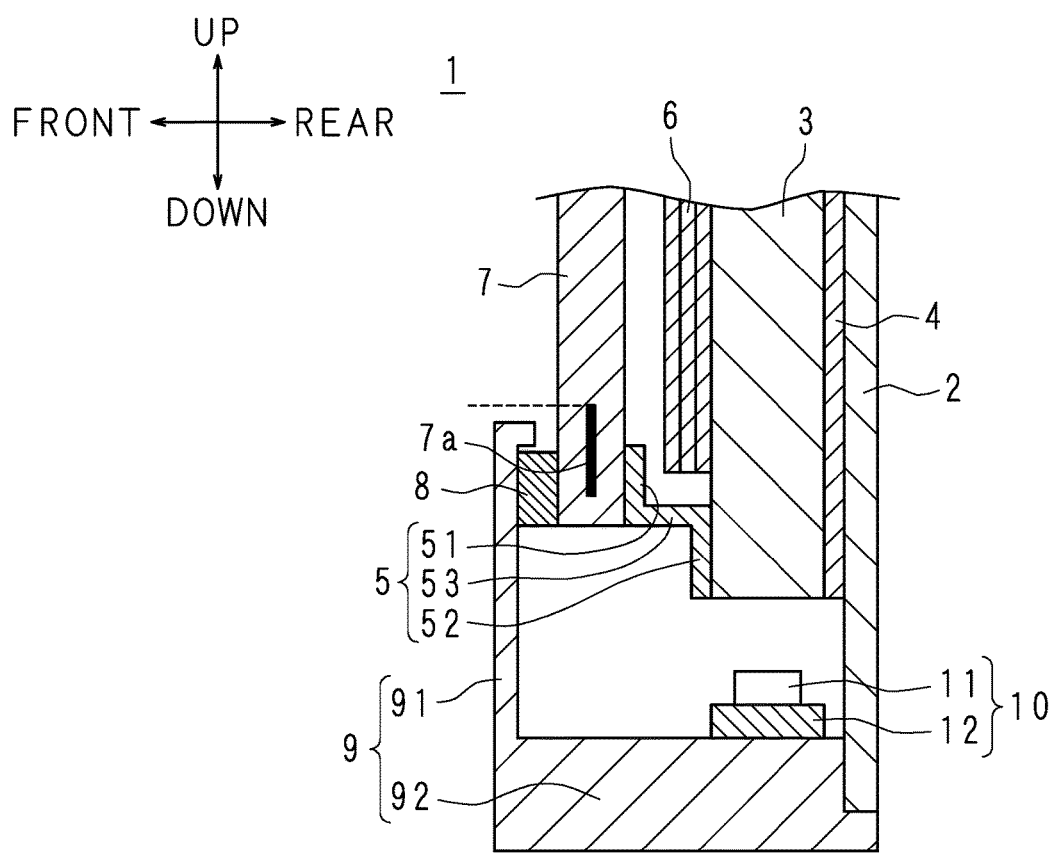
FIG. 1 is a partial sectional side view schematically showing a lower part of a display apparatus according to Embodiment 1.

The following description explains the present invention based on the drawing showing a display apparatus 1 according to Embodiment 1. FIG. 1 is a partial sectional side view schematically showing a lower part of the display apparatus 1 according to Embodiment 1. The following description uses up and down as well as front and rear showing with arrows in the drawings. Note that the front of the drawing corresponds to the right side and the back of the drawing corresponds to the left side. The display apparatus 1 is used for a television receiver, an electronic signboard or a monitor for a personal computer, etc.

The display apparatus 1 comprises a backlight chassis 2 having a shape of a rectangular plate. The backlight chassis 2 is placed in the vertical direction, one surface (front surface) of the backlight chassis 2 faces the front, and another surface (rear surface) thereof faces the back. A rectangular light guide plate 3 is provided on the front surface of the backlight chassis 2 via a reflective sheet 4. The light guide plate 3 is made of glass. Light enters through a lower side surface of the light guide plate 3. The entering light diffusely reflects within the light guide plate 3 and exits from a front surface of the light guide plate 3. Note that the light exiting from a rear surface of the light guide plate 3 reflects in the reflective sheet 4 and enters the light guide plate 3 again.

A rectangular display panel 7 is provided on the front of the light guide plate 3 via four spacers 5. The display panel 7 faces the light guide plate 3. A peripheral portion of the light guide plate 3 is located outside the display panel 7. The spacers 5 are bar-shaped and are arranged along an upper edge portion, a lower edge portion, a left edge portion and a right edge portion of the light guide plate 3, respectively. The spacers 5 are made of metal or foamed polymer. The spacers 5 form a predetermined gap between the display panel 7 and the light guide plate 3. In the gap, a plurality of optical sheets 6, 6, 6 (in this example, three optical sheets) are provided in the front surface of the light guide plate 3. The optical sheets 6 perform diffusion or focusing, etc. of light.

The display panel 7 is provided with a glass substrate on the front and with a glass substrate on the back, and liquid crystal is sealed between the two glass substrates. The display panel 7 is constructed to control a voltage to be applied on the liquid crystal and to adjust a transmittance of light.

The display apparatus 1 comprises a frame body 9. The frame body 9 is provided with a front frame part 91 having a shape of a rectangular frame and with a cylindrical part 92 projecting from an outer peripheral portion of the front frame part 91 backwards. The front frame part 91 is provided in a peripheral portion of a front surface of the display panel 7 via a buffer member 8. The outer peripheral portion of the front frame part 91 is located outside with respect to the light guide plate 3, the optical sheet 6 and the display panel 7.

A rear end portion of the cylindrical part 92 is connected with the backlight chassis 2. The rear end portion of the cylindrical part 92 is connected with the backlight chassis 2 by screwing or engagement, for example.

A light source 10 is provided in a lower inner surface of the cylindrical part 92 so that the light source 10 faces the lower side surface of the light guide plate 3. The light source 10 is provided with an LED 11 (Light Emitting Diode) and with an LED substrate 12. The LED substrate 12 has a shape of a rectangular elongated plate and is placed flat.

A lower surface of the LED substrate 12 is adhered to the lower inner surface of the cylindrical part 92 with a double-sided tape or an adhesive. A plurality of the LEDs 11 are aligned on an upper surface of the LED substrate 12 in a longitudinal direction of the LED substrate 12. Light emitted by the LED 11 enters the lower side surface of the light guide plate 3 and exits from the front surface of the light guide plate 3. Note that the light source 10 may be provided so that the light source 10 faces a left side surface, a right side surface or an upper side surface of the light guide plate 3. The light source 10 is not limited to the LED 11. As the light source 10, an LD (Laser Diode), an organic EL (Electro-Luminescence) or a cold cathode fluorescent tube, or the like may be used, for example.

The above-described bar-shaped spacer 5 has a crank-shaped section in a case where a plane orthogonal to a longitudinal direction thereof is a cut plane. The spacer 5 is provided with a plate-shaped panel attaching part 51 which is fastened to an edge portion of a rear surface of the display panel 7, with a plate-shaped light-guide-plate attaching part 52 which is fastened to an edge portion of the front surface of the light guide plate 3, and with a connecting part 53 which connects the panel attaching part 51 with the light-guide-plate attaching part 52. The panel attaching part 51 faces the display panel 7 and has a shape of a plate which is elongated along the edge portion of the display panel 7, and a front surface of the panel attaching part 51 is fastened to the edge portion of the rear surface of the display panel 7 with the double-sided tape or the adhesive.

The light-guide-plate attaching part 52 faces the light guide plate 3 and has a shape of a plate which is elongated along the edge portion of the light guide plate 3, and a rear surface of the light-guide-plate attaching part 52 is fastened to the edge portion of the front surface of the light guide plate 3 with the double-sided tape or the adhesive. The connecting part 53 has a shape of an elongated plate orthogonal to the panel attaching part 51 and to the light-guide-plate attaching part 52, and connects an outer edge portion (a lower edge portion in FIG. 1) of the panel attaching part 51 with an inner edge portion (an upper edge portion in FIG. 1) of the light-guide-plate attaching part 52. The panel attaching part 51 and the light-guide-plate attaching part 52 projects from the connecting part 53 in a direction opposite to each other.

As described above, the edge portion of the light guide plate 3 is located outside the display panel 7, and the light-guide-plate attaching part 52 is provided in the edge portion of the light guide plate 3. The light-guide-plate attaching part 52 is provided outside the display panel 7, and a gap allowing the optical sheet 6 to expand and contract is thereby formed between the optical sheet 6 and the connecting part 53.

Note that a black matrix 7a is buried in the edge portion of the display panel of liquid crystal, and the spacer 5 and the gap are located outside with respect to the black matrix 7a (below a dashed line shown in FIG. 1). That is, the spacer 5 and the gap are located in a non-display area. Note that a display area is located inside with respect to the black matrix 7a (above the dashed line shown in FIG. 1).

The light-guide-plate attaching part 52 of the spacer 5 which is fastened to the light guide plate 3 is located outside with respect to the panel attaching part 51 which is fastened to the display panel 7, and a gap allowing the optical sheet 6 to expand and contract is thereby formed between the optical sheet 6 arranged in the front surface of the light guide plate 3 and the light-guide-plate attaching part 52. Accordingly, it is possible to prevent the warp of the optical sheet 6 at the time of heating and the optical leak of the optical sheet 6 at the time of cooling.

The panel attaching part 51 and the light-guide-plate attaching part 52 have a shape of a plate approximately parallel to the display panel 7 and to the light guide plate 3, which can prevent the increase in size of the display apparatus 1. The connecting part 53 is orthogonal to the panel attaching part 51 and to the light-guide-plate attaching part 52, and a gap is thereby between the display panel 7 and the light guide plate 3 reliably.

As compared with a resin member made of plastic etc., a glass member whose linear expansion coefficient is low is used for the light guide plate 3 and a metal member or a foamed member is used for the spacer 5, which can reduce the warp occurring therebetween at the time of heating or cooling. The edge portion of the light guide plate 3 is located outside the display panel 7, which can increase the rigidity of the light guide plate 3 and also the rigidity of the display panel 1.

Embodiment 2

Figure 2:
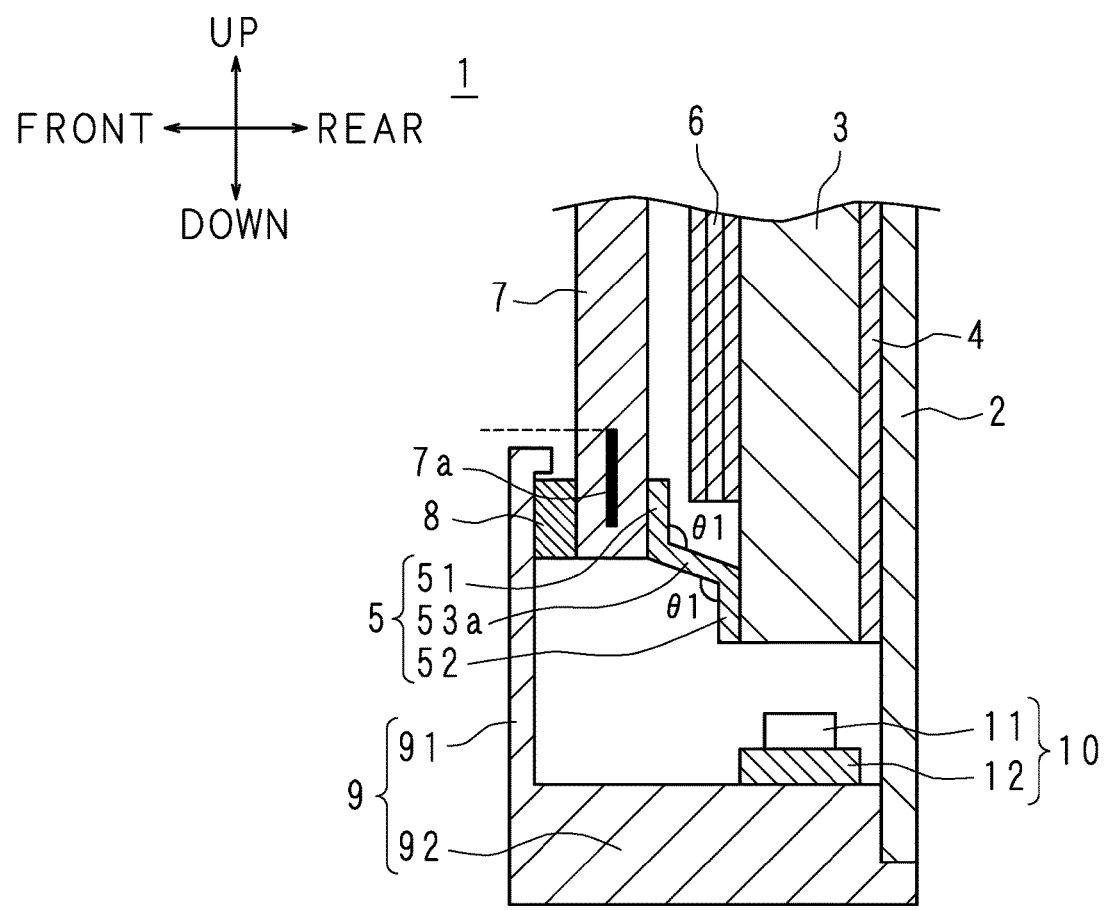
FIG. 2 is a partial sectional side view schematically showing a lower part of a display apparatus according to Embodiment 2.

The following description explains the present invention based on the drawing showing a display apparatus 1 according to Embodiment 2. FIG. 2 is a partial sectional side view schematically showing a lower part of the display apparatus 1.

A connecting part 53a of the spacer 5 is inclined with respect to each of the panel attaching part 51 and the light-guide-plate attaching part 52. Interior angles (θ1 shown in FIG. 2) formed between the connecting part 53a and each of the panel attaching part 51 and the light-guide-plate attaching part 52 are obtuse angles. A gap formed at a region proximal to the display panel 7 between the light guide plate 3 and the connecting part 53a is larger than a gap formed at a region proximal to the display panel 7 therebetween. The optical sheet 6 located at a region proximal to the light guide plate 3 has a thermal expansion coefficient higher than those of another optical sheets 6.

Even in a case where the optical sheet 6 located at a region proximal to the light guide plate 3 has the thermal expansion coefficient higher than those of another optical sheets 6, the larger gap is formed at a region proximal to the light guide plate 3, which can prevent the warp of the optical sheet 6 at the time of heating.

The same configurations as in Embodiment 1, of the configurations of the display apparatus 1 according to Embodiment 2, are designated with the same reference numerals, and detailed explanations thereof are omitted.

Embodiment 3

Figure 3:
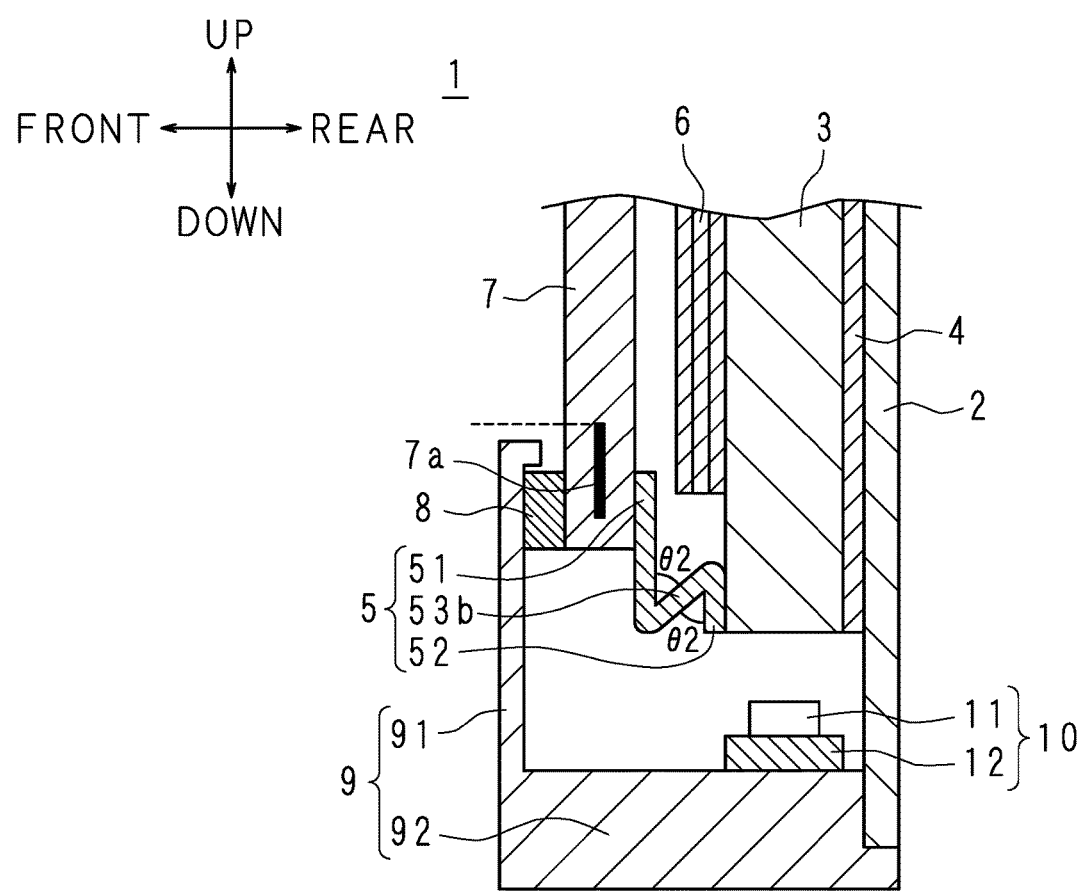
FIG. 3 is a partial sectional side view schematically showing a lower part of a display apparatus according to Embodiment 3.

The following description explains the present invention based on the drawing showing a display apparatus 1 according to Embodiment 3. FIG. 3 is a partial sectional side view schematically showing a lower part of the display apparatus 1.

The panel attaching part 51 projects from the display panel 7 outwards. A connecting part 53b connects a projecting end portion of the panel attaching part 51 with an inner edge portion of the light-guide-plate attaching part 52, and is inclined with respect to each of the panel attaching part 51 and the light-guide-plate attaching part 52. Interior angles (θ2 shown in FIG. 3) formed between the connecting part 53b and each of the panel attaching part 51 and the light-guide-plate attaching part 52 are acute angles. A gap formed at a region proximal to the display panel 7 between the optical sheet 6 and the connecting part 53b is larger than a gap formed at a region proximal to the light guide plate 3. The optical sheet 6 located at a region proximal to the display panel 7 has a thermal expansion coefficient higher than those of another optical sheets 6.

Even in a case where the optical sheet 6 located at a region proximal to the display panel 7 has the thermal expansion coefficient higher than those of another optical sheets 6, the larger gap is formed at a region proximal to the light guide plate 7, which can prevent the warp of the optical sheet 6 at the time of heating.

The same configurations as in Embodiment 1 or 2, of the configurations of the display apparatus 1 according to Embodiment 3, are designated with the same reference numerals, and detailed explanations thereof are omitted.

Embodiment 4

Figure 4:
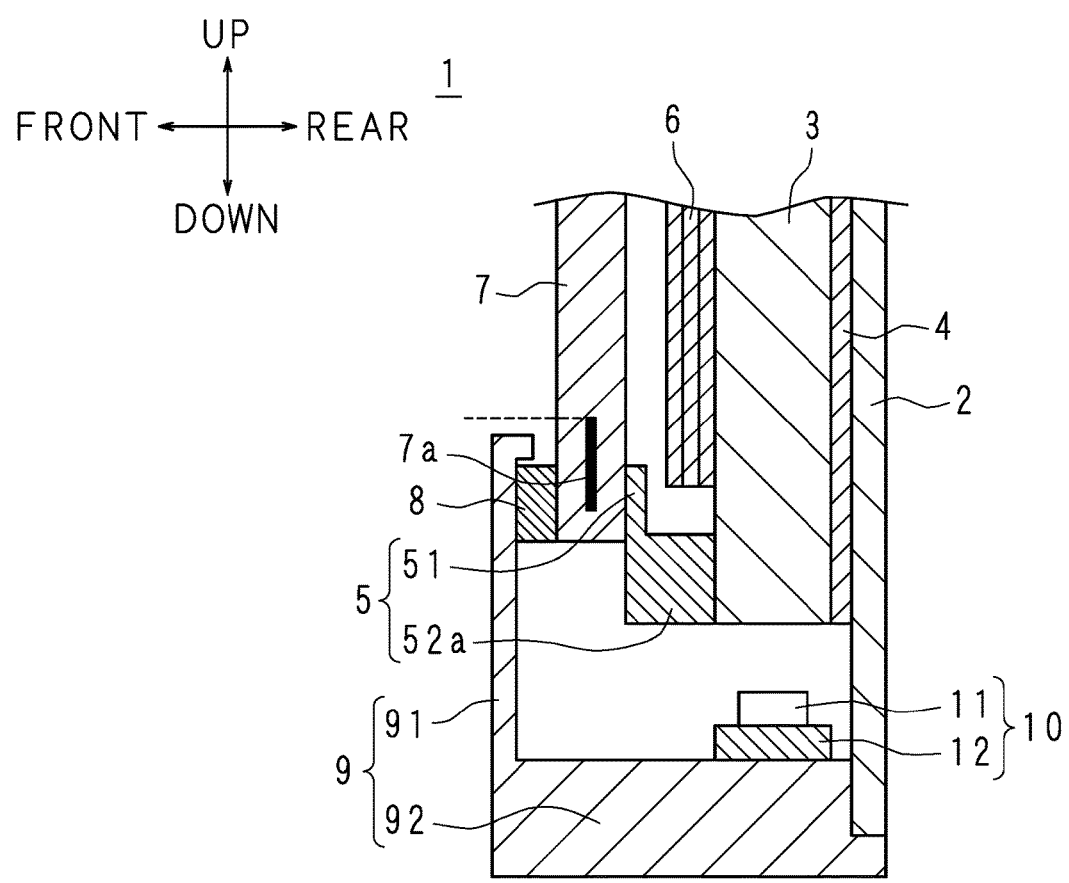
FIG. 4 is a partial sectional side view schematically showing a lower part of a display apparatus according to Embodiment 4.

The following description explains the present invention based on the drawing showing a display apparatus 1 according to Embodiment 4. FIG. 4 is a partial sectional side view schematically showing a lower part of the display apparatus 1.

A light-guide-plate attaching part 52a has a shape of a column extending along the edge portion of the light guide plate 3. The light-guide-plate attaching part 52a is fixed to the edge portion of the front surface of the light guide plate 3. A front portion of the light-guide-plate attaching part 52a integrally continues to the panel attaching part 51. The light-guide-plate attaching part 52a has a size in a front/rear direction (thickness) which is larger than that of the panel attaching part 51 and is approximately the same as that existing between the display panel 7 and the light guide plate 3. The spacer 5 is not provided with the connecting part and the light-guide-plate attaching part 52a has the shape of the thick column, which can increase the rigidity of the spacer 5.

The same configurations as in Embodiments 1 to 3, of the configurations of the display apparatus 1 according to

Embodiment 5

Figure 5:
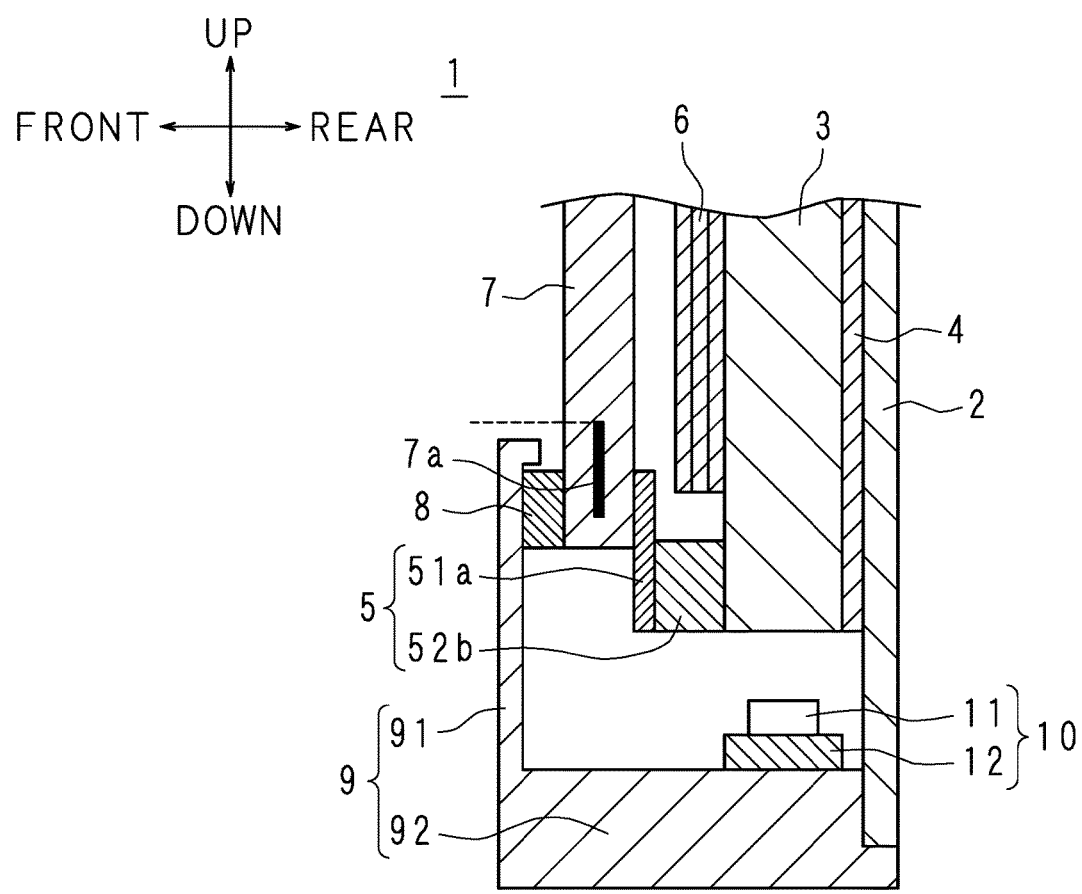
FIG. 5 is a partial sectional side view schematically showing a lower part of a display apparatus according to Embodiment 5.

The following description explains the present invention based on the drawing showing a display apparatus 1 according to Embodiment 5. FIG. 5 is a partial sectional side view schematically showing a lower part of the display apparatus 1.

A plate-shaped panel attaching part 51a faces the rear surface of the display panel 7. The panel attaching part 51a is fixed to the edge portion of the rear surface of the display panel 7. The panel attaching part 51a projects from the edge portion of the display panel 7 outwards, and a light-guide-plate attaching part 52b has a shape of a column extending along the edge portion of the light guide plate 3. The light-guide-plate attaching part 52b is fixed to the edge portion of the front surface of the light guide plate 3.

The spacer 5 is not provided with the connecting part and the panel attaching part 51a and the light-guide-plate attaching part 52b are comprised of separate members. The light-guide-plate attaching part 52b has a size in the front/rear direction (thickness) which is larger than that of the panel attaching part 51a. The total size in the front/rear direction of the panel attaching part 51a and the light-guide-plate attaching part 52a is approximately the same as the size in the front/rear direction existing between the display panel 7 and the light guide plate 3. A front portion of the light-guide-plate attaching part 52b is fixed to a rear surface of the panel attaching part 51a with the double-sided tape or the adhesive.

The light-guide-plate attaching part 52b is column-shaped, which can increase the rigidity of the spacer 5. The panel attaching part 51a and the light-guide-plate attaching part 52b are comprised of separate members, which can simplify the shapes of the panel attaching part 51a and the light-guide-plate attaching part 52b and then can facilitate the molding (extrusion molding, for example) of the panel attaching part 51a and the light-guide-plate attaching part 52b.

The same configurations as in Embodiments 1 to 4, of the configurations of the display apparatus 1 according to Embodiment 5, are designated with the same reference numerals, and detailed explanations thereof are omitted.

Although in the above-described Embodiments the spacer 5 is provided in each edge portion of the light guide plate 3, the spacer 5 may be provided in the upper edge portion and the lower edge portion of the light guide plate 3 only or in the left edge portion and the right edge portion of the light guide plate 3 only. Alternatively, the spacer 5 may be provided in any three of the upper edge portion, the lower edge portion, the left edge portion and the right edge portion of the light guide plate 3. The spacer 5 may be shortened and a plurality of the shortened spacers 5 may be aligned in the edge portion of the light guide plate 3. The spacer 5 may be block-shaped and a plurality of the block-shaped spacers 5 may be aligned in the edge portion of the light guide plate, for example.

Although in the above-described Embodiments the light guide plate 3 is made of glass, the light guide plate 3 may be comprised of another member having a light-transmittance. The light guide plate 3 may be comprised of an acrylic plate, for example. The spacer 5 is made of metal or foamed polymer, but it may be comprised of a resin member made of resin other than the foamed polymer.

Embodiments disclosed herein are to be construed as illustrative and not restrictive in all aspects. Furthermore, the technical features described in Embodiments can be combined with one another, and all changes that fall within metes and bounds of Claims, and equivalence of such metes and bounds thereof are therefore intended to be embraced by Claims of the present invention.

It is to be noted that, as used herein and in the appended claims, the singular forms "a", "an", and "the" include plural referents unless the context clearly dictates otherwise.

The invention claimed is:

1. A display apparatus comprising:
   a display panel having a rectangular shape which has (i) a front surface comprising a display area for displaying an image and a non-display area surrounding the display area, and (ii) a rear surface which is opposite to the front surface;
   an optical sheet having a rectangular shape which has (i) a front surface facing the rear surface of the display panel, and (ii) a rear surface which is opposite to the front surface;
   a light guide plate having a rectangular shape which has a front surface facing the rear surface of the optical sheet, the front surface of the light guide plate has (i) a central region which is contact with the rear surface of the optical sheet and (ii) a peripheral region out of the central region which is not in contact with the rear surface of the optical sheet;
   a spacer which extends in a longitudinal direction of a side surface of the light guide plate and is disposed between the light guide plate and the display panel so as to form a space between the front surface of the light guide plate and the rear surface of the display panel at which the optical sheet is arranged,
   wherein
   the rear surface of the display panel has an attached region which is opposite to the non-display area of the front surface of the display panel,
   the spacer consists of:
      a panel attaching part having a flat plate shape elongating in the longitudinal direction which has a front surface in contact with the attached region in the rear surface of the display panel; and
      a light-guide-plate attaching part having a flat plate shape elongating in the longitudinal direction which continues to the panel attaching part and has a rear surface in contact with the peripheral region in the front surface of the light guide plate; and
      a connecting part having a flat plate shape elongating in the longitudinal direction which connects the panel attaching part and the light-guide-plate attaching part, and
   wherein the spacer has a crank-shaped cross-section orthogonal to the longitudinal direction such that the panel attaching part and the light-guide-plate attaching part extend away from the connecting part in opposite directions, and
   in a view along a front-rear direction, an outer edge of the light-guide-plate attaching part is located outside an outer edge of the panel attaching part or is located at the same as the outer edge of the panel attaching part,
   in the view along the front-rear direction, the spacer is arranged outside the display area of the front surface of the display panel and inside the front surface of the light guide plate,
   the spacer does not connect to any portions which are configured outside of the light guide plate, and the spacer contacts with the display panel via only the front surface of the panel attaching part, and contacts with the light guide plate via only the rear surface of the light-guide-plate attaching part.

2. The display apparatus according to claim 1, wherein in the view along the front-rear direction, an inner edge of the light-guide-plate attaching part is located outside an inner edge of the panel attaching part.

3. The display apparatus according to claim 1, wherein in the view along the front-rear direction, a black matrix in the display panel and a part of the panel attaching part overlap.

4. The display apparatus according to claim 1, wherein in the view along the front-rear direction, the light-guide-plate attaching part and a black matrix in the display panel do not overlap.

5. The display apparatus according to claim 1, wherein the light-guide-plate attaching part has a thickness thicker than that of the panel attaching part.

6. The display apparatus according to claim 1, wherein the light guide plate is made of glass, and
the spacer is made of metal or foamed polymer.

7. The display apparatus according to claim 1, wherein the spacer does not contact with the optical sheet.

8. The display apparatus according to claim 1, wherein an entire of the rear surface of the light-guide-plate attaching part is attached to the front surface of the light guide plate.

9. The display apparatus according to claim 1, wherein a part or an entire of the front surface of the panel attaching part is attached to the rear surface of the display panel.

10. The display apparatus according to claim 1, wherein the spacer comprises four spacers provided on the front surface of the light guide plate along four edge portions of the light guide plate respectively.

11. The display apparatus according to claim 1, wherein in a view along a front-rear direction, an outer edge of the spacer is located at the same position as an edge of the light guide plate.

12. The display apparatus according to claim 1, wherein
the connecting part is rectangular plate-shaped having a first side and a second side parallel to the first side, the first side being attached to the panel attaching part and a second side being attached to the light-guide plate attaching part, so that the light-guide-plate attaching part continues to the panel attaching part via the connecting part.

13. The display apparatus according to claim 12, wherein the connecting part is orthogonal to the panel attaching part and to the light-guide-plate attaching part.

14. The display apparatus according to claim 13, wherein the first side of the connecting part is attached to the outer edge of the panel attaching part, and the second side of the connecting part is attached to the inner edge of the light-guide-plate attaching part.

15. The display apparatus according to claim 12, wherein the connecting part is plate-shaped and is inclined with respect to the panel attaching part and to the light-guide-plate attaching part to form an acute angle or an obtuse angle.

16. The display apparatus according to claim 15, wherein the first side of the connecting part is attached to the outer edge of the panel attaching part, and the second side of the connecting part is attached to the inner edge of the light-guide-plate attaching part.

* * * * *

UNITED STATES PATENT AND TRADEMARK OFFICE
CERTIFICATE OF CORRECTION

PATENT NO. : 10,371,886 B2  
APPLICATION NO. : 15/320308  
DATED : August 6, 2019  
INVENTOR(S) : Arimasa Sugimoto et al.

Page 1 of 1

It is certified that error appears in the above-identified patent and that said Letters Patent is hereby corrected as shown below:

On the Title Page

At item (54) and in the Specification at Column 1, Line 1, please correct the title so that it reads: "SPACER FOR A DISPLAY APPARATUS"

Signed and Sealed this  
Twelfth Day of November, 2019

Andrei Iancu  
*Director of the United States Patent and Trademark Office*